B. WATTS.
PIPE WRENCH.
APPLICATION FILED OCT. 9, 1919.
Reissued Jan. 13, 1920. 14,791.
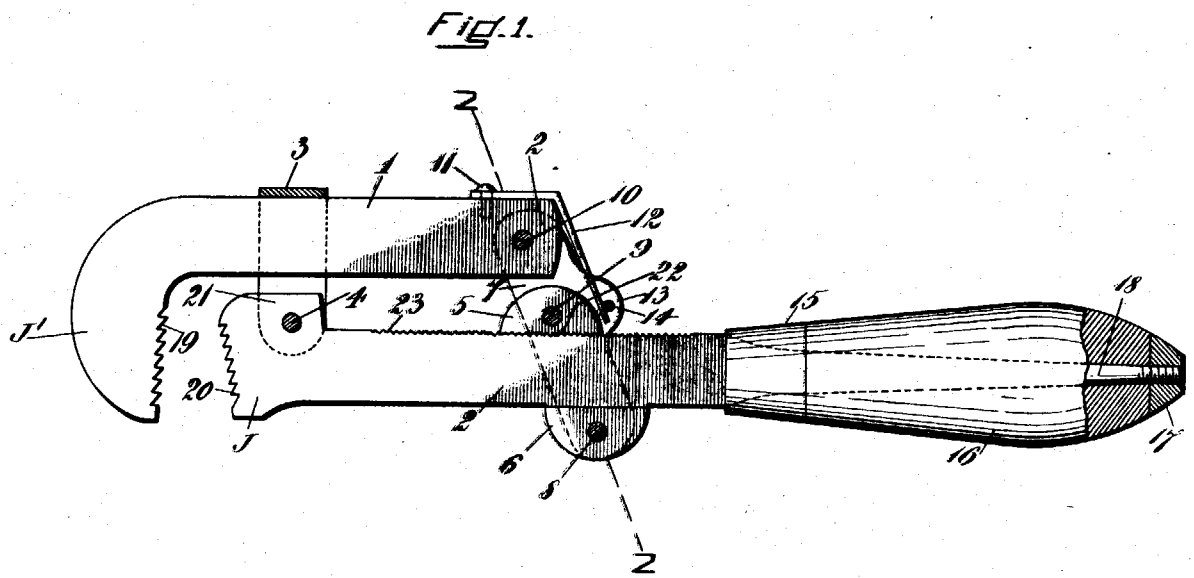
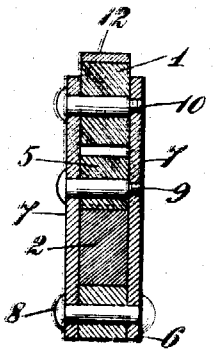
INVENTOR:
Ben Watts
By Crabb & Hayes
ATTORNEYS.

UNITED STATES PATENT OFFICE.

BEN WATTS, OF JARBIDGE, NEVADA, ASSIGNOR OF FORTY-NINE PER CENT. TO WARREN P. GODFREY, OF JARBIDGE, NEVADA.

PIPE-WRENCH.

14,791. Specification of Reissued Letters Patent. Reissued Jan. 13, 1920.

Original No. 1,275,334, dated August 13, 1918, Serial No. 230,510, filed April 24, 1918. Application for reissue filed October 9, 1919. Serial No. 329,613.

*To all whom it may concern:*

Be it known that I, BEN WATTS, a citizen of the United States, residing at Jarbidge, in the county of Elko and State of Nevada, have invented certain new and useful Improvements in Pipe-Wrenches, of which the following is a specification, reference being had to the accompanying drawings.

This invention relates to certain improvements in wrenches and has relation more particularly to a device of this general character especially designed and adapted for use in connection with pipes or the like, and it is an object of the invention to provide a novel and improved device of this general character comprising two relatively movable jaws together with coacting means whereby said jaws may be readily and quickly adjusted one relative to the other.

It is also an object of the invention to provide a novel and improved wrench of this general character including a shank provided with a fixed jaw together with a sliding jaw coacting with the fixed jaw and which sliding jaw includes a shank operatively engaged with sliding dogs arranged at opposite faces of the shank and wherein one of said dogs constitutes a locking member and the second dog affords a medium whereby the desired movement of the sliding jaw relative to the fixed jaw may be obtained by the thumb or other digit of the hand grasping the shank or the handle secured to the shank.

The invention consists in the details of construction and in the combination and arrangement of the several parts of my improved wrench whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be better understood, I will now proceed to describe the same with reference to the accompanying drawings, wherein:

Figure 1 is a view partly in elevation and partly in section of a wrench constructed in accordance with an embodiment of my invention; and Fig. 2 is a sectional view taken substantially on the line 2—2 of Fig. 1.

As disclosed in the accompanying drawing J denotes a fixed jaw arranged at the outer end of a main shank 2. The opposite end of the shank 2 is provided with an elongated tang 18 which is disposed through the handle member or hand grasp 16. Coacting with the inner end portion of the handle member or hand grasp 16 is the ferrule 15 and in threaded engagement with the free end portion of the tang 18 is the holding member or nut 17 which coacts with the ferrule 15 to maintain the handle member or hand grasp 16 in proper position upon the tang 18.

J' denotes a sliding jaw extending laterally of the outer end portion of a movable secondary shank 1 and the working face 19 overlies the working face 20 of the jaw J and it is to be noted that the jaws 19 and 20 are arranged on relative angles to facilitate the proper engagement thereof with a pipe or similar work and that the teeth carried by said jaws are reversely directed for reasons which are believed to be clearly apparent to those skilled in the art to which my present invention appertains.

The shank 1 overlaps an edge face of the shank 2 and is freely disposed through a guide loop or yoke 3. The guide loop or yoke 3 is substantially U-shape in form and has the free end portions thereof overlying the opposite faces of the extended portion 21 of the jaw J disposed in a direction toward the shank 1 and the free portions of the guide loop or yoke 3 are pivotally engaged with said portion 21 through the medium of the pintle 4.

The inner or free end portion of the shank 1 is pivotally engaged with the opposite sides thereof through the medium of the pintle 10 of the end portions of the straps or rigid members 7. The members 7 are of a length to extend across the opposite side faces of the shank 2 and extend therebeyond. Coacting with the outer edge face of the shank 2 or that edge face remote from the shank 1 is a sliding dog 6 positioned between the outer end portions of the rigid members or straps 7 and pivotally engaged therewith through the medium of the pintle 8. The dog 6 is substantially semi-circular in form and has its straight face arranged for contact with the outer edge face of the shank 2.

5 denotes a second sliding dog positioned between the members or straps 7 and pivotally supported thereby through the medium of the pintle 9. The dog 5 is also substantially semi-circular in form and has its straight edge coacting with the inner edge face of the shank 2 opposed to the shank 1. The straight edge of the dog 5 is provided with teeth 22 adapted to interlock with the teeth 23 produced in the coacting inner edge face of the shank 2.

The longitudinal margins of the members or straps 7 opposed to the handle member or hand grasp 16 at points intermediate the shanks 1 and 2 are provided with outstanding ears 13 and the space between said ears is intersected by the pin 14 suitably secured thereto. Underlying the pin 14 is the free end portion of the flat spring 12 which has its opposite end portion overlying the outer edge face of the shank 1 at its inner or free end and secured thereto by the screw 11 or other suitable anchoring means. The spring 12 coacts with the pin 14 and constantly urges the shank 1 outwardly and the members 7 downwardly so that the dogs 5 and 6 are normally held in clutching contact with the adjacent edge faces of the shank 2 and which results in the teeth 22 of the dog 5 interlocking with the teeth 23 of the shank 2 whereby the movable jaw J′ is held against movement relative to the jaw J in a direction longitudinally of the shank 2 whereby an effective grip with the pipe or other work is assured. It will be noted, however, that the jaw J′ is capable of limited swinging movement relative to the jaw J and which with the spring urging the shank 1 outwardly, prevents the jaws from sticking to the pipe or other work after a hard blow has been imposed upon the shank 2. It is also to be noted that when the dogs 5 and 6 have their straight faces engaged with the opposed edge face of the shank 2 the members or straps 7 are arranged on an incline toward the handle member or hand grasp 16 which results in the dogs 5 and 6 being offset one relative to the other in a direction longitudinally of the shank 2 with the outer dog 6 disposed toward the handle member or hand grasp 16.

When it is desired to adjust the jaw J′ in a direction longitudinally of the shank 2 the thumb of the hand grasping the handle member 16 is placed upon the dog 6 and by forcing the dog 6 forwardly the teeth 22 of the dog 5 will be disengaged from the teeth 23 of the shank 2 and which movement results in the desired separating movement between the jaws J and J′. When it is desired to close the wrench it is only necessary to push upon the jaw J′.

From the foregoing description, it is thought to be obvious that a wrench constructed in accordance with my invention is particularly well adapted for use by reason or the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

Having thus fully described my invention, I claim and desire to secure by Letters Patent of the United States:—

1. A pipe wrench comprising a shank having a fixed jaw at one end, a guide loop pivotally engaged with the shank adjacent the jaw and extending laterally therefrom, a second shank disposed through the guide loop and overlapping an edge face of the first-named shank, said second-named shank being provided with a jaw overlying the fixed jaw, a member pivotally engaged with the free end portion of the second shank and extending across the first-named shank, dogs pivotally engaged with said member and coacting with the opposite edge faces of the shank, each of said dogs being substantially semi-circular in form and having its straight face engageable with the edge face of the first-named shank, one of said dogs and the coacting edge face of the first-named shank being provided with teeth adapted to interlock, a pin carried by the member and overlying the toothed face of the first-named shank and rearwardly of the dog coacting with said face, and a flat spring carried by the second-named shank and contacting with the pin carried by the member for normally maintaining the straight faces of the dogs in contact with the coacting edge faces of the first-named shank.

2. A pipe wrench comprising a shank having a fixed jaw at one end, a guide loop pivotally engaged with the shank adjacent the jaw and extending laterally therefrom, a second shank disposed through the guide loop and overlapping an edge face of the first-named shank, said second-named shank being provided with a jaw overlying the fixed jaw, a member pivotally engaged with the free end portion of the second shank and extending across the first-named shank, dogs pivotally engaged with said member and coacting with the opposite edge faces of the shank, each of said dogs being substantially semi-circular in form and having its straight face engageable with an edge face of the first-named shank, one of said dogs and the coacting edge face of the first-named shank being provided with teeth adapted to interlock, a pin carried by the member and overlying the toothed face of the first-named shank and rearwardly of the dog coacting with said face, and a flat spring carried by the second-named shank and contacting with the pin carried by the member for normally maintaining the straight faces of the dogs in contact with the coacting edge faces of the first-named shank, said dogs being offset one relatively to the other longitudinally of the first-named shank when the straight faces of said dogs are in engagement with the coacting edge faces of the shank.

3. A wrench having a main shank carrying a jaw, a movable secondary shank carrying a jaw in opposition to said first-named jaw, means connecting said shanks whereby said secondary shank may be movable relatively to said main shank and the jaw carried by it occupy different adjusted positions with relation to the jaw carried by said main shank, said means comprising a member pivotally engaged with said secondary shank and extending across said main shank, a dog pivotally engaged with said member and engaging the outer edge face of said main shank, a dog carried by said member and engaging the inner edge face of said main shank, said dogs being positioned whereby they will be offset one relatively to the other in a direction longitudinal to said main shank when occupying positions in engagement therewith as aforesaid, and means for yieldingly exerting pressure upon said member for normally maintaining said dogs in their said offset engaging positions.

4. A wrench having a main shank carrying a jaw, a movable secondary shank carrying a jaw in opposition to said first-named jaw, means connecting said shanks whereby said secondary shank may be movable relatively to said main shank and the jaw carried by it occupy different adjusted positions with relation to the jaw carried by said main shank, said means comprising a member pivotally engaged with said secondary shank and extending across said main shank, a dog pivotally engaged with said member, said dog having a straight face engaging the outer edge face of said main shank and slidable thereon, a dog carried by said member and engaging the inner edge face of said main shank, said dogs being positioned whereby they will be offset one relatively to the other in a direction longitudinal to said main shank when occupying positions in engagement therewith as aforesaid, and means for yieldingly exerting pressure upon said member for normally maintaining said dogs in their said offset engaging positions.

5. A wrench having a main shank presenting a smooth edge face, a toothed edge face and carrying a jaw, a movable secondary shank carrying a jaw in opposition to said first-named jaw, means connecting said shanks whereby said secondary shank may be movable relatively to said main shank and the jaw carried by it occupy different adjusted positions with relation to the jaw carried by said main shank, said means comprising a member pivotally engaged with said secondary shank and extending across said main shank, a dog pivotally engaged with said member, said dog having a face engaging the smooth edge face of said main shank and slidable thereon, a dog carried by said member and engaging the toothed edge face of said main shank, said dogs being positioned whereby they will be offset one relatively to the other in a direction longitudinal to said main shank when occupying positions in engagement therewith as aforesaid, and means for yieldingly exerting pressure upon said member for normally maintaining said dogs in their said offset engaging positions.

6. A wrench having a main shank presenting a smooth edge face, a toothed edge face and carrying a jaw, a movable secondary shank carrying a jaw in opposition to said first-named jaw, means connecting said shanks whereby said secondary shank may be movable relatively to said main shank and the jaw carried by it occupy different adjusted positions with relation to the jaw carried by said main shank, said means comprising a member pivotally engaged with said secondary shank and extending across said main shank, dogs pivotally engaged with said member, one of said dogs presenting an edge face in engagement with the smooth edge face of said main shank and slidable thereon, the other of said dogs presenting a toothed edge face in engagement with the toothed edge face of said main shank, said dogs being positioned whereby they will be offset relatively to one another in a direction longitudinal to said main shank when occupying positions in engagement therewith as aforesaid, and means for yieldingly exerting pressure upon said member for normally maintaining said dogs in their said offset engaging positions.

7. A wrench having a main shank carrying a jaw, a movable secondary shank carrying a jaw in opposition to said first-named jaw, means connecting said jaws whereby said secondary shank may be movable relatively to said main shank and the jaw carried by it occupy different adjusted positions with relation to the jaw carried by said main shank, said means comprising a member pivotally engaged with said secondary shank and extending across said main shank, a dog carried by said member and engaging the outer edge face of said main shank, a dog pivotally engaged with said member and engaging the inner edge face of said main shank, said dogs being positioned whereby they will be offset one relatively to the other in a direction longitudinal to said main shank when occupying positions in engagement therewith as aforesaid, and means for yieldingly exerting pressure upon said member for normally maintaining said dogs in their said offset engaging positions.

8. A wrench having a main shank carrying a jaw, a movable secondary shank carrying a jaw in opposition to said first-named jaw, means connecting said shanks whereby said secondary shank may be movable relatively to said main shank and the jaw carried by it occupy different adjusted positions with relation to the jaw carried by said main shank, said means comprising a member pivotally engaged with said secondary shank and extending across said main shank, a dog carried by said member and engaging the outer edge face of said main shank, a dog pivotally engaged with said member and presenting an edge face engaging the inner edge face of said main shank, said dogs being positioned whereby they will be offset one relatively to the other in a direction longitudinal to said main shank when occupying positions in engagement therewith as aforesaid, and means for yieldingly exerting pressure upon said member for normally maintaining said dogs in their said offset engaging positions.

9. A wrench having a main shank carrying a jaw, a movable secondary shank carrying a jaw in opposition to said first-named jaw, means connecting said shanks whereby said secondary shank may be movable relatively to said main shank and the jaw carried by it occupy different adjusted positions with relation to the jaw carried by said main shank, said means comprising a member pivotally engaged with said secondary shank and extending across said main shank, a dog pivotally engaged with said member and presenting an edge face engaging the outer edge face of said main shank, a dog pivotally engaged with said member presenting an edge face engaging the inner edge face of said main shank, said dogs being positioned whereby they will be offset one relatively to the other in a direction longitudinal to said main shank when occupying positions in engagement therewith as aforesaid, and means for yieldingly exerting pressure upon said member for normally maintaining said dogs in their said offset engaging positions.

10. A wrench having a main shank presenting a smooth edge face, a toothed edge face and carrying a jaw, a movable secondary shank carrying a jaw in opposition to said first-named jaw, means connecting said shanks whereby said secondary shank may be movable relatively to said main shank and the jaw carried by it occupy different adjusted positions with relation to the jaw carried by the main shank, said means comprising a member pivotally engaged with said secondary shank and extending across said main shank, a dog carried by said member engaging the smooth edge face of said main shank and slidable thereon, a dog pivotally engaged with said member engaging the toothed edge face of said main shank, said dogs being positioned whereby they will be offset one relatively to the other in a direction longitudinal to said main shank when occupying positions in engagement therewith as aforesaid, and means for yieldingly exerting pressure upon said member for normally maintaining said dogs in their said offset engaging positions.

11. A wrench comprising a shank having a fixed jaw combined with a movable shank carrying a jaw, a member pivoted to said last-named shank and carrying dogs in engagement with the opposite edge faces of said first-named shank, a loop attached to said first-named shank and loosely embracing said movable shank, and a spring flexed between said movable shank and said member whereby it may normally act to urge said movable shank outwardly against said loop and press said dogs into clutching engagement with said first-named shank.

12. A wrench comprising a shank having a fixed jaw combined with a movable shank carrying a jaw, a member pivoted to said last-named shank and carrying dogs in engagement with the opposite edge faces of said first-named shank, a pin carried by said member, and a spring fixed to said movable shank and flexed between the same and said pin whereby said dogs will normally be maintained in clutching engagement with said first-named shank.

BEN WATTS.